(12) United States Patent
Sheppard

(10) Patent No.: US 8,381,290 B2
(45) Date of Patent: Feb. 19, 2013

(54) INTRUSION DETECTION SYSTEMS AND METHODS

(75) Inventor: Martin L. Sheppard, Vernon, NY (US)

(73) Assignee: Exelis Inc., McLean, VA (US)

( * ) Notice: Subject to any disclaimer, the term of this patent is extended or adjusted under 35 U.S.C. 154(b) by 867 days.

(21) Appl. No.: 12/504,766

(22) Filed: Jul. 17, 2009

(65) Prior Publication Data
US 2011/0016522 A1 Jan. 20, 2011

(51) Int. Cl.
G06F 21/00 (2006.01)
(52) U.S. Cl. ............... 726/22; 726/13; 726/23; 726/24; 726/25; 707/E17.042; 707/E17.044; 713/188
(58) Field of Classification Search ............... 726/13, 726/22–25; 713/188; 709/E17.042, E17.044
See application file for complete search history.

(56) References Cited

U.S. PATENT DOCUMENTS

| 5,918,223 | A | * | 6/1999 | Blum et al. ............................ 1/1 |
| 6,021,491 | A | * | 2/2000 | Renaud ........................ 713/179 |
| 6,212,525 | B1 | * | 4/2001 | Guha ............................ 707/747 |
| 6,594,665 | B1 | * | 7/2003 | Sowa et al. ............................ 1/1 |
| 8,191,139 | B2 | * | 5/2012 | Heimerdinger et al. ........ 726/23 |
| 2002/0083060 | A1 | * | 6/2002 | Wang et al. ..................... 707/10 |
| 2004/0064737 | A1 |   | 4/2004 | Milliken et al. |
| 2005/0172312 | A1 | * | 8/2005 | Lienhart et al. ................. 725/19 |
| 2005/0187890 | A1 |   | 8/2005 | Sullivan |
| 2006/0236392 | A1 | * | 10/2006 | Thomas et al. ................. 726/23 |
| 2007/0250521 | A1 |   | 10/2007 | Kaminski, Jr. |
| 2008/0317278 | A1 | * | 12/2008 | Lefebvre et al. ............. 382/100 |
| 2009/0044275 | A1 | * | 2/2009 | Takahashi et al. .............. 726/24 |
| 2010/0005528 | A1 | * | 1/2010 | Teller et al. .................... 726/22 |

FOREIGN PATENT DOCUMENTS

WO 2006052618 A2 5/2006

OTHER PUBLICATIONS

Todd Heberlein, Worm Detection and Prevention: Concept, Approach, and Experience, Net Squared, Inc., Aug. 14, 2002.
Partial Search Report, EP10170010 (5 pages).
European Search Report, EP10170010 May 4, 2011, (10 pages).

* cited by examiner

Primary Examiner — Kambiz Zand
Assistant Examiner — Tongoc Tran
(74) Attorney, Agent, or Firm — Edell, Shapiro & Finnan, LLC

(57) ABSTRACT

Systems and methods for intrusion and virus detection in computer networks. Data from a file, network byte stream, or other source is segmented and resulting data items are subjected to multiple processing techniques to obtain respective result values, or thumbprints. The multiple thumbprints for respective data items are then aggregated to obtain a single result value, or aggregate thumbprint. The components of the aggregate thumbprint may be "fuzzified" to allow for less preciseness in the single result value. The aggregate thumbprint is compared to other similarly generated aggregate thumbprints stored in a library. Alerts may be generated when the same aggregate thumbprint is detected multiple times.

18 Claims, 6 Drawing Sheets

| Metric | Summary | Measures |
|---|---|---|
| Byte count | Number of bytes in item | Quickly discriminates grossly different items |
| A_EAOS | Add even values, subtract odd using ASCII character values | Similar character content without regard to order. |
| A_GEA_LTS | Add when character >= last, subtract when < last | Similar character content as well as sort order of characters |
| A_RELATIVE | Add even values, subtract odd using Displacement between characters | Similar patterns of relative movement from character to character without regard to each individual character |
| ASCIICount ExtCharCount CntrlCharCount | 3 separate metrics detailing counts of characters in ASCII, Control and Extended Character set range | Character distributions |
| ascTransCount decTransCount eqTransCount eqCharCount | Metrics detailing counts of transition of sort order of characters between equal, ascending, descending as well as counts of character repetition | Character sort transitions |
| Byte Frequency Hash | Hash detailing byte occurrence frequency | Byte Frequency |

*Fig. 3*

INTRUSION DETECTION SYSTEMS AND METHODS

The attached appendix is a print out of results of processing data in accordance with embodiments of the present invention. The appendix is intended to illustrate an example implementation, and not to define or limit the scope of the invention.

FIELD OF THE INVENTION

Embodiments of the present invention are related to systems and methods for characterizing and detecting digital data and digital data streams.

BACKGROUND OF THE INVENTION

Systems and methods developed to characterize digital data (or byte) streams are known. Such systems and methods are often used to detect computer viruses and worms and the like. More specifically, intrusion detection and antivirus systems typically use "signatures" to detect specific patterns or characters or digital bytes. Hashes, checksums and other numeric calculations are frequently used to characterize digital files and bytes streams, including legitimate software files and malware. These techniques are used to identify items that are identical to the source of the signature. Generally speaking, they are not intended or even capable of detecting similar, but non-identical, items.

There is, however, a known approach, as described in Todd Heberlein, *Worm Detection and Prevention: Concept, Approach, and Experience,* 14 Aug. 2002, NetSquared, Inc. (2002, unpublished) ("Heberlein"), that is capable of detecting similarity among selected sets of data. As explained by Heberlein, it is possible to characterize a selected portion of data using a "thumbprint." In this case, the thumbprint is represented by the result of a hash function applied to the selected portion of data.

FIG. 6 shows the basic approach according to Heberlein. The original content, "The quick brown fox jumped over the lazy dog." is sent through a hash function that generates a number. The original content consisted of 360 bits (8 bits per character times 45 characters) and the result is a single 32-bit number (a typical unsigned integer on most computers).

This number can serve as type of compact representation (i.e., the "thumbprint") of the original content. For example, suppose a document is processed by this technique. A hash number is computed for each sentence in the document, and then the computed hash numbers are stored together in a hash table. Later, if a user provides a sample sentence and asks if that sentence is in the document, the following algorithm can be used to very quickly determine the answer. First, the hash value of the sample sentence is computed. Second, the hash table is queried to see if that number exists in the table. If it is not in the table, then the sample sentence is not in the document. Third, if there is a match, then the sentence (or sentences) in the original document that created the hash value is examined and it is determined if it, indeed, matches the sample sentence.

As further explained by Heberlein, traditional hash functions do not work well in certain scenarios. Specifically, most hash functions are designed to produce a completely different hash number even if the content only varies by a single byte. For example, referring again to FIG. 6, if the original sentence is only slightly modified by changing the word "dog" to "dogs," then a completely different hash number may be generated. In fact, using traditional hashing functions, a review of the resulting numbers for each string would not indicate that the two sentences were very similar at all.

Heberlein goes on to explain that in order to diminish gross discrepancies between seemingly similar collections of data, it is possible to employ a multivariate statistical analysis technique called principal component analysis (CPA) to the selected data, and, as a result, the gross discrepancies can be significantly diminished.

Despite the advances described by Heberlein, there remains a desire to provide improved systems and methods for detecting computer viruses, worms, other computer attacks and/or any other data that may repeatedly pass over a network.

SUMMARY OF THE INVENTION

Embodiments of the present invention provide systems and methods for intrusion and virus detection in computer networks. A method in accordance with an embodiment of the present invention includes receiving data via an electronic network and segmenting the data into data items. A data item may be isolated to obtain a selected data item. The selected data item is then processed in accordance with one more processing techniques to obtain characteristic metrics in respect to the selected data item. The resulting values of the characteristic metrics are combined to obtain an "aggregate thumbprint" of the selected data item. That aggregate thumbprint is then compared to a plurality of aggregate thumbprints stored in a library of aggregate thumbprints to determine whether a match exists between the aggregate thumbprint and any of the aggregate thumbprints in the library of aggregate thumbprints.

In one embodiment, the precision of the values of the characteristic metrics is decreased to increase the likelihood of a match. The precision may be decreased by, e.g., rounding values of the characteristics metrics.

Characteristic metrics may include counting a number of bytes in the selected data item, adding to a counter even byte values and subtracting from the counter odd byte values, or adding to a counter when a subsequent byte has an ASCII value greater than an immediately prior byte, and subtracting from the counter when a subsequent byte has an ASCII value that is less than an immediately prior byte, among others.

In an embodiment, a hashing function is applied to the selected data item after calculating values for the characteristic metrics.

These and other features of the several embodiments of the invention along with their attendant advantages will be more fully appreciated upon a reading of the following detailed description in conjunction with the associated drawings.

BRIEF DESCRIPTION OF THE DRAWINGS

FIG. 3 shows several possible analytical techniques or metrics that may be calculated with respect to a data item in accordance with an embodiment of the present invention;

DETAILED DESCRIPTION

Embodiments of the present invention provide the ability to detect and characterize data passing over a network. More specifically, embodiments of the present invention detect similar bytes streams and may more accurately infer malicious intent by detecting frequent repetition of data streams by analyzing content, order and/or size of the data of interest.

Generally, the methods and systems described herein can be applied to packets, documents, and images or log files, among other types of data, in an effort to detect computer viruses, worms, other computer attacks or data of interest, known a priori, or not.

Figure 1:
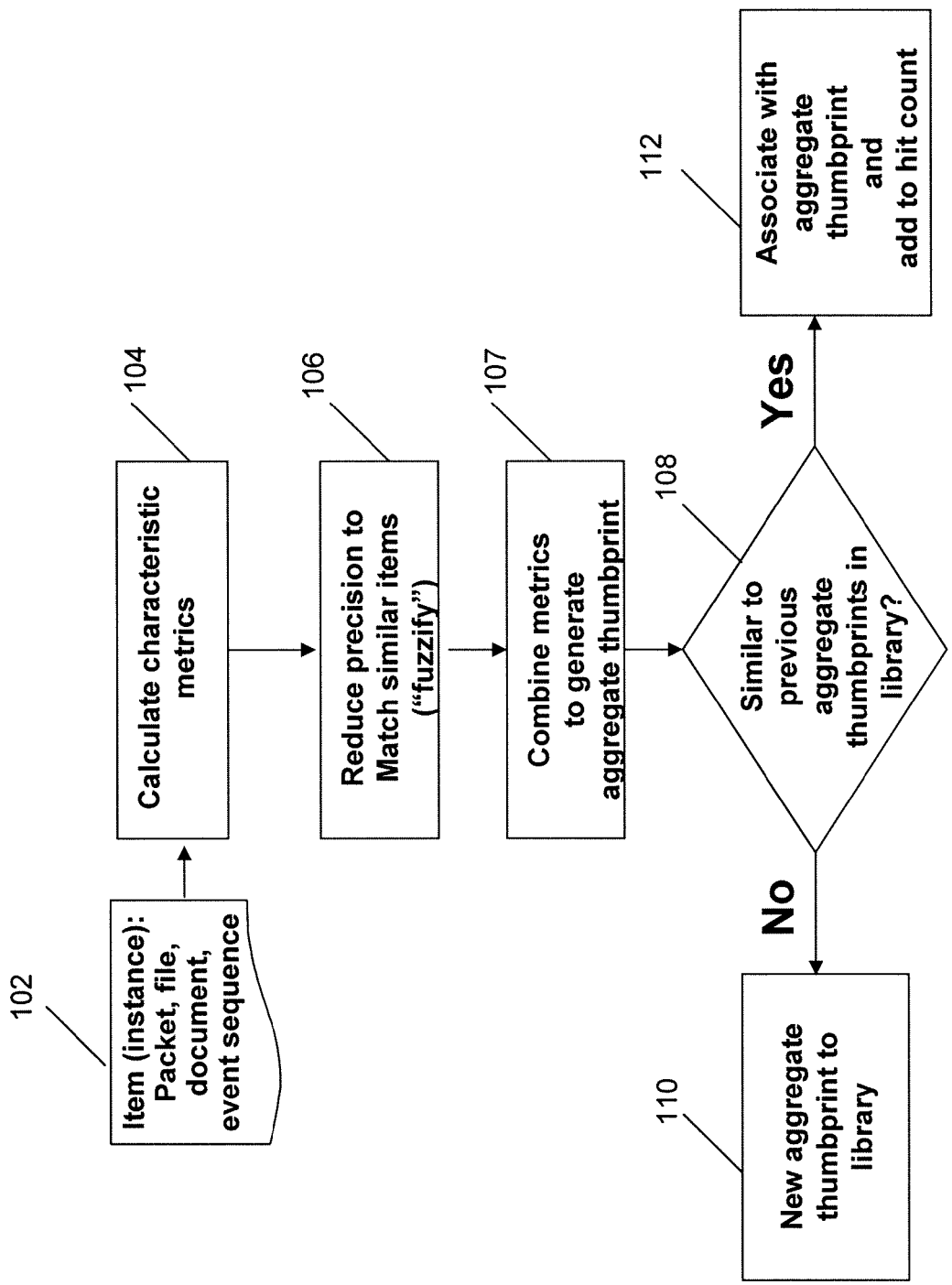
FIG. 1 shows a flow chart that depicts a method in accordance with an embodiment of the present invention.

Referring now to FIG. 1, there is shown a flow chart that depicts a method in accordance with an embodiment of the present invention. The method begins at step 102 where a data item of interest is selected for analysis. It should be understood that the item can be a single, fleeting, item, an item that is a portion of a larger data set, file, document, etc., or an ever-increasing or decreasing portion of that larger data set, etc. Once the item is selected for analysis, characteristic metrics are calculated at step 104 for that item. Resulting metrics are then "fuzzified" at step 106 to reduce their precision and thus make it more likely that the values will match other similarly-calculated values. Then, at step 107, an aggregate thumbprint is generated as a single number, or string, that is derived by, e.g., concatenating the several metrics into a single string.

At decision step 108, it is determined whether the most recently generated aggregate thumbprint is similar to any previously-generated aggregate thumbprints stored in a library of such aggregate thumbprints. If not, then at step 110, a new thumbprint is added to the library. If a match is detected, then the most recently generated aggregate thumbprint is associated with that stored aggregate thumbprint and a "hit" counter (not shown) associated with the stored thumbprint is incremented.

Figure 2:
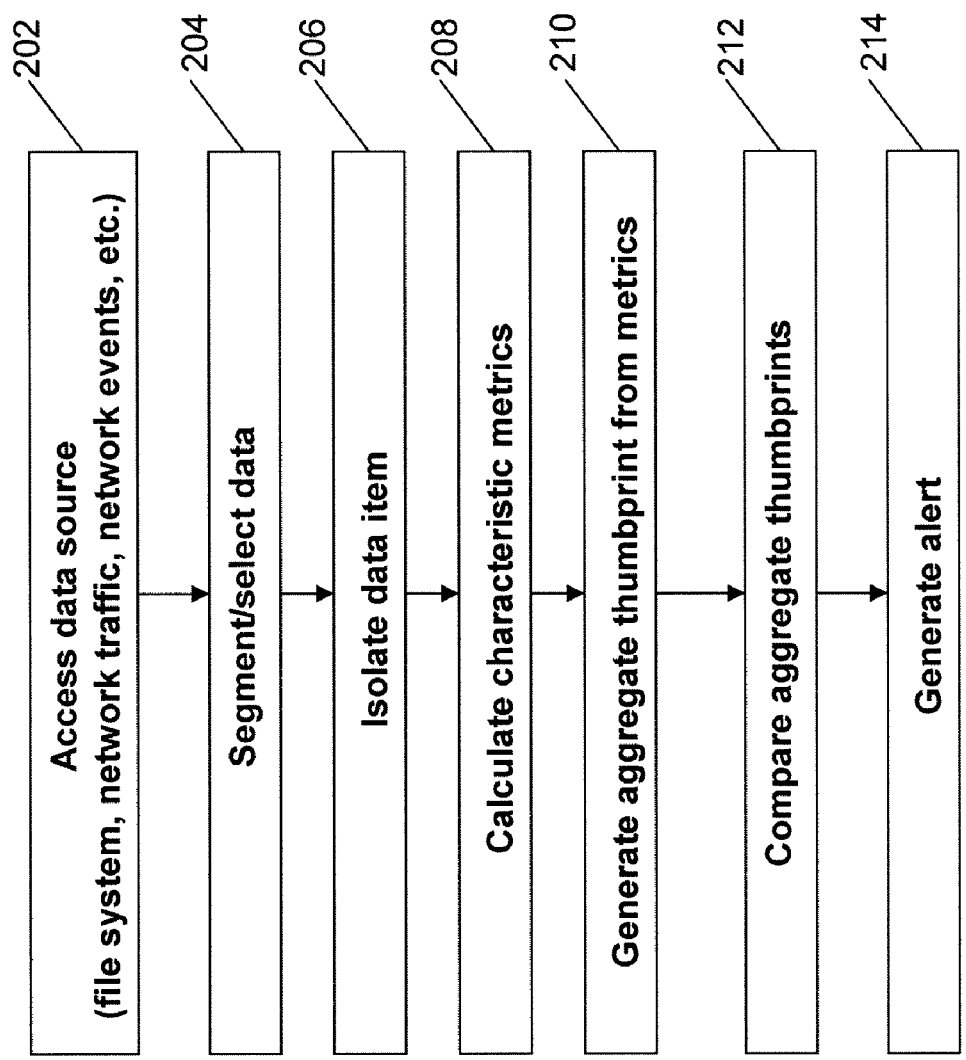
FIG. 2 shows a more detailed version of a method in accordance with an embodiment of the present invention.

FIG. 2 shows a more detailed version of a method in accordance with an embodiment of the present invention. At step 202, a data source is accessed. The data source may be, for example, a file from a file system, network traffic, network events (e.g., logs files), or any other source of data that may be examined in accordance with the methodology described herein.

At step 204, and as briefly described above, the data source need not be taken as a whole. Rather, the data source may be segmented into smaller components to increase resolution and thereby enable identification/matching of relatively smaller data items. So, for example, a large word processing document could be segmented by paragraph (e.g., by hard returns), by page, by sets of three or four words, etc. Likewise, an image (e.g., a bit map) need not be taken as a whole. Instead, the image may be segmented in a regular grid pattern, or could be segmented by regular or irregular (even overlapping) shapes such as circles, rectangles or other polygons. There is no specific size limit (lower or higher) for data segmentation. Thus, it will be appreciated that a given file, set of network traffic, or the like, may have a plurality of aggregate thumbprints associated therewith once that file, set of network traffic, etc. is segmented for processing in accordance with embodiments of the present invention.

In step 206 the data item is isolated. The item may be placed in a specific memory location, a set of contiguous memory locations, a database, or any other location where it can be accessed.

In step 208, one or several characteristic metrics are calculated, examples of which are discussed more fully below. In a preferred embodiment, each resulting metric is then "fuzzified" so that its precision is reduced. This may be accomplished, for example, by rounding the resulting values of respective metrics.

The aggregate thumbprint is then generated at step 210. In an embodiment of the present invention, the aggregate thumbprint is a single string that is derived from the series of metrics, or separate analytical techniques that are applied, respectively, to the selected/isolated data item.

FIG. 3 lists several possible analytical techniques/processes/metrics that may be calculated with respect to a data item, where the metrics may then combined to generate the aggregate thumbprint. Example metrics that may be used in connection with embodiments of the present invention are described next.

Byte Count

This metric counts the number of bytes in the data item and can, thus, quickly discriminate grossly different data items.

A_EAOS—ASCII Even Add, Odd Subtract

This metric adds even ASCII byte values to, and subtracts odd ASCII byte values from a counter or register. This metric analyzes similar character content without regard to order.

A_GEA_LTS—ASCII, Greater/Equal Add, Less Than Subtract

This metric adds to a counter or register when an ASCII character is >= the last ASCII character, and subtracts from the counter or register when the current character is < the last character. This metric analyzes similar character content as well as sort order of characters.

A_RELATIVE—ASCII Relative

This metric adds even values, and subtracts odd values of ASCII byte values using Displacement between characters. For example, the letters A→C have a displacement of two, or an even value. With this relative measure, similar patterns of relative movement from character to character without regard to each individual character can be detected.

ASCIICount, ExtCharCount, and CntrlCharCount

These are three separate metrics detailing counts of characters in ASCII, Extended Character, and Control Character sets, and provide a helpful character distribution analysis.

ascTransCount, decTransCount, eqTransCount, and eqCharCount

These metrics provide counts of transition of sort order of characters between ascending, descending, and equal, as well as counts of character repetition, and provide still more analysis regarding character sort transitions.

Byte Frequency Hash

This metric provides details about byte occurrence frequency, and provides an overall byte frequency.

In one embodiment, a hashing function is applied to data item after calculating any of the characteristic metrics. In this way, thumbprints can be more easily shared with others with less chance of compromising information about the data item.

Referring again to FIG. 2, after each thumbprint metric is separately calculated, the several (or a subset of) metrics are combined, at step 210, to form a single value—the aggregate thumbprint. In a simple embodiment, the several thumbprint values are concatenated into a single string.

At step 212, a given aggregate thumbprint is compared to a plurality of previously-generated aggregate thumbprints stored in a library of aggregate thumbprints to identify matches. More specifically, for each data item (as represented by an aggregate thumbprint), a comparator determines if there is a matching aggregate thumbprint in the library. If there is a matching value, the match is recorded in the library (by, e.g., incrementing a counter) and data identifying the current data item is associated with the matching aggregate thumbprint value. If there is no matching value, a new aggregate thumbprint record is entered into the library with data identifying the data item.

At step 214, if the comparator determines that a data item matches an existing aggregate thumbprint, it compares the recorded observation frequency to a threshold. An alert may then be generated if the threshold is exceeded.

Figure 4:
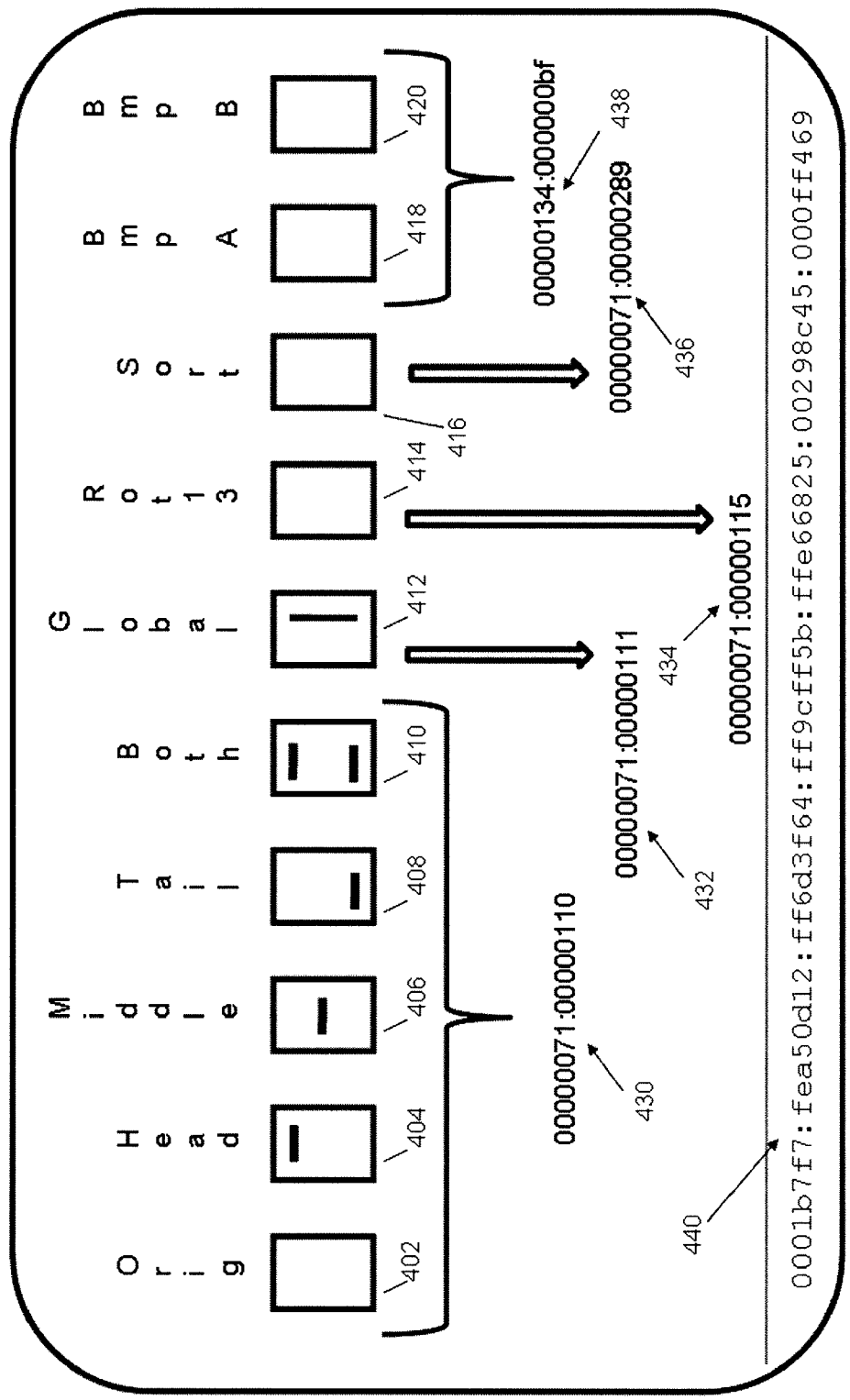
FIG. 4 is a schematic representation of several experimental results obtained from embodiments in accordance with the present invention.

FIG. 4 is a schematic representation of several experimental results obtained from embodiments in accordance with the present invention. Element 401 represents an original document or data item. In this case, the document was a text document having a size of about 110 kilobytes. Element 404 represents the same document, but with a text change made to the first few lines. Similarly, elements 406, 408 and 410 represent the same original document, but with text changes made, respectively, in the middle of the document, the tail or end of the document, and both the beginning and end of the document.

Element 440 shows the raw values in hexadecimal notation of seven individual metrics concatenated into a string, for a selected data item. In element 440, the metrics have not been "fuzzified," e.g., rounded. Element 430, on the other hand, shows two of the metrics (again in hexadecimal) in concatenated form, but here the metrics have already been fuzzified. The metric on the left side of the colon is the byte count metric, and the metric on the right side of the colon is the A_GEA_LTS metric, both described above. As can be seen, this pair of metrics is the same regardless of where the modification of the document was made—beginning, middle, end, or both beginning and end.

It should be understood that FIG. 4 is only meant as an example, and thus shows only two concatenated fuzzified metrics. However, those skilled in the art will appreciate that any number of the metrics may be concatenated in like fashion for comparison with other like concatenated metrics.

Referring again to FIG. 4, element 412 represents case where a global change (e.g., all occurrences of the word "data" were changed to "dtaa", resulting in numerous order only changes) was made to original document 402. In this case, element 432 indicates that while the byte count remained the same, the fuzzified A_GEA_LTS metric changed by one (from 110 to 111). In a similar context, a Rot13 cipher was applied to the original document to obtain data item 414. In this case, the byte count again remained the same (71), but the A_GEA_LTS metric changed further (see element 434). Finally, element 416 represents a re-sorted version of the original document 402. In this case, the byte count again remained the same, but the A_GEA_LTS metric changed even further (see element 436).

The last two elements 418 and 420 represent a first bitmap "A" and a second bitmap "B" where the bitmap B is a slightly altered version of bitmap A, namely by one pixel. As can be seen from element 438, the byte counts are the same for these two bitmaps and the A_GEA_LTS metric is also the same.

From the foregoing, those skilled in the art will appreciate that using the fuzzified aggregated thumbprints in accordance with embodiments of the present invention makes it possible to detect similar, though not identical, data items, especially similar data items whose difference lay in sort order. Consequently, embodiments of the present invention have multiple potential applications as discussed below.

a. Detection of Zero Day Attacks

New network attacks using methods not previously observed are referred-to as "Zero-day" attacks. Zero-day attacks often generate frequent repetitions of the same or similar network traffic because many computers are attacked or probed in a short time. The capability of embodiments of the present invention to detect such repetitions can help detect such attacks.

Many zero-day attacks are actually variations of previous attacks. Provided a library of thumbprints for historical attacks, the capability of embodiments of the present invention to detect closely similar byte streams can help detect such variations before an exact "signature" is obtained.

B. Indications and Warnings for Other Locations when a Zero Day Attack is Identified Characterization of attacks using the aggregate thumbprint (a single number) allows attack identification to be rapidly and covertly shared with other locations/organizations, which can then use the same thumbprint to identify similar attacks.

c. Distribution of Classified Signatures on Unclassified Networks.

It is difficult or impossible to derive ("reverse engineer") the original data item from which an aggregate thumbprint was derived. An aggregate thumbprint therefore represents an attack "signature" that can be communicated without revealing knowledge of the actual attack. Therefore, whereas knowledge of a particular attack may be classified, the aggregate thumbprint "signature" may be treated as unclassified information because it in no way reveals the classified information.

d. Centralized Zero Day Detection without Transmission of Entire Byte Streams

Attack detection using embodiments of the present invention can be performed at a central location, or at multiple locations with a central location serving as a central thumbprint library. Thumbprints can be efficiently distributed from the library to distributed locations (e.g. for distributed sensors) because only the compact thumbprint value needs to be transmitted, not the entire malicious byte stream.

e. Detecting Files Designated as Malware/Trojans/Inappropriate Content that Have Had Minor Changes Applied, for Detection in Transit and/or for Forensic Analysis.

Aggregate thumbprints can be calculated for computer files identified as malicious or illegal, such as viruses, worms, "malware", pornography, or terrorist information. The thumbprints of copies of such files that have minor changes (e.g. a few words, or pixels in an image) should be identical to or numerically close to the thumbprints of the original. Thumbprints can therefore be used to detect such files either in transit on a network or in storage on specific computers (e.g. during forensic analysis).

f. Attack Attribution

Aggregate thumbprints cannot identify the specific person, agent or computer that is the source of an attack. However, by providing a means of identifying similar network traffic or file, it can be used to identify similar hostile activity at multiple network locations, which can assist in tracing the source.

g. Detecting the Dissemination of Documents Designated as Non-Releasable or Confidential.

Observation of the thumbprint of a document designated as restricted or confidential in an unauthorized location (e.g. on at a network sensor or on an unauthorized computer) strongly indicates the presence of the document in that location. Moreover, because the aggregate thumbprint is unchanged for small changes in the source item, this method of detecting unauthorized release is resilient to attempts to hide the release through such changes.

h. Correlation of Activity Patterns

The aggregate thumbprints of sequences of activity patterns, such as network intrusion detection signatures, can be calculated. This can provide a means of correlating such activity and identifying similar patterns.

Figure 5:
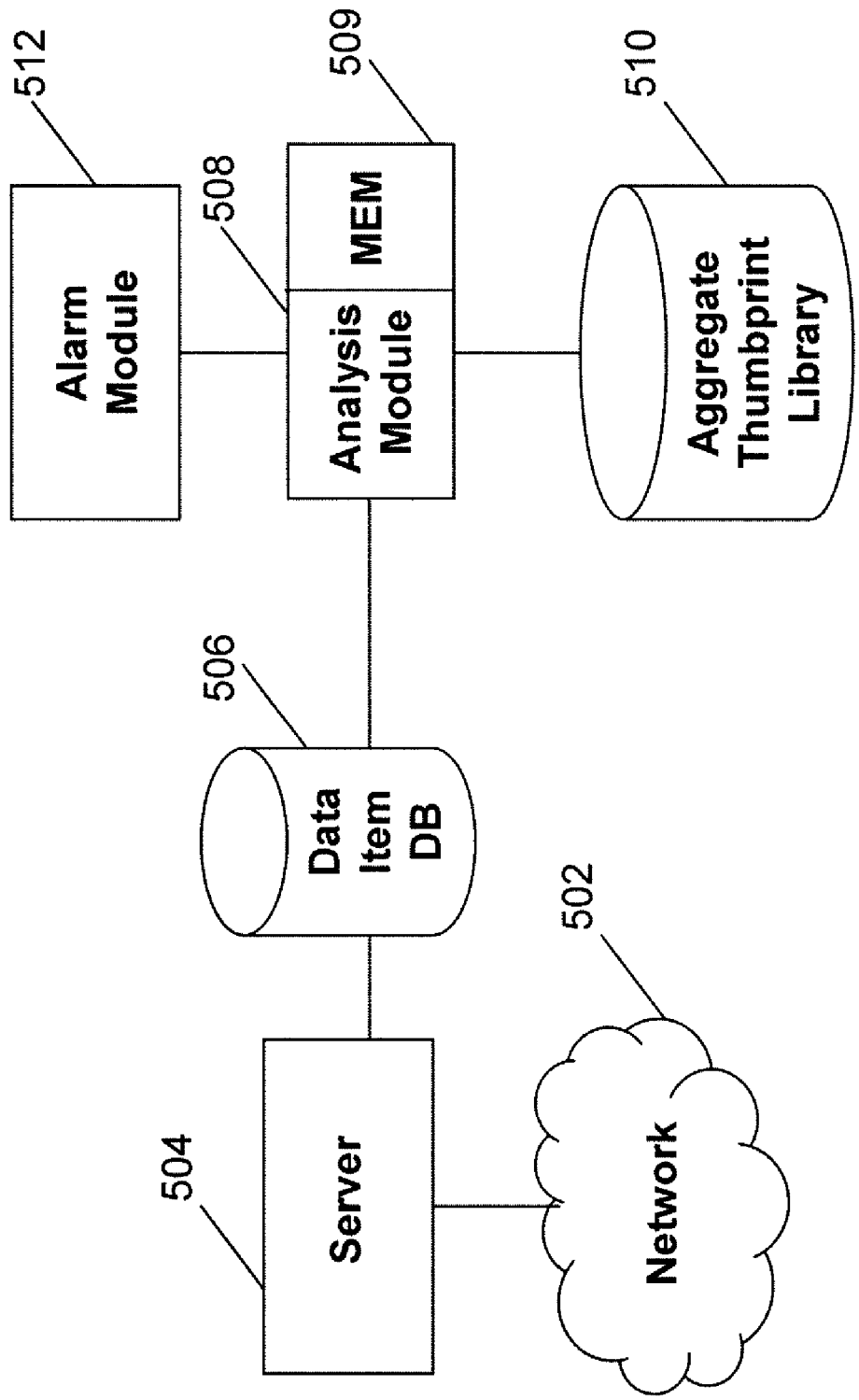
FIG. 5 depicts an arrangement of several elements and modules for implementing embodiments of the present invention.
Figure 6:
FIG. 6 shows results of a conventional hash function applied to similar but non-identical data items in accordance with the prior art.

FIG. 5 depicts an arrangement of several physical elements and modules for implementing embodiments of the present invention. More specifically, a server 504 or some other electronic device is in communication with, e.g., network 502 over which data can be passed. Some of that data is received or captured by server 504 and stored in data item database 506. Data item database 506 may be realized as a single physical unit, or may be realized as a distributed database implemented with well-known hard disk technology, among other known storage device technology.

Analysis module 508 accesses data item database 506 and either directly analyses data items as described above, or first segments data stored in the data item database 506 and then analyzes the thus-segmented data items. Analysis module 508, using physical memory 509 such as random access memory (RAM), dynamic RAM (DRAM), or magnetic RAM (MRAM), and the like, preferably calculates the characteristic metrics of data items, reduces the precision of the resulting values, and combines those values into a string to obtain an aggregate thumbprint. The aggregate thumbprint is then compared to other similarly-calculated aggregate thumbprints stored in the aggregate thumbprint library 510. If a match is found, and a threshold number of matches has been detected, then alarm module 512 may raise an alarm by, e.g., providing a notification email, text message, signal light or tone, or "dashboard" indication, among other possible techniques.

Those skilled in the art will appreciate that elements 506, 508, 509, 510 and 512 may be implemented substantially separately as shown, or may be combined as may be appropriate. For example, all (or some) of these elements may be incorporated into server 504 or other single computing device.

The appendix attached hereto is a print out of results of processing data in accordance with embodiments of the present invention. In this case a relatively simple phrase/string "This is AN example" is processed first, and then at page 8 of the appendix, a similar string "This IS an example" is processed second. The respective characteristic metrics for these two strings are shown, character by character, i.e., byte by byte. The bottom of page 14 of the appendix compares the results of the two strings. The appendix is intended to illustrate an example implementation, and not to define or limit the scope of the invention.

The foregoing elements and modules depicted in FIG. 5 may be implemented in hardware, and/or a combination of hardware and software as may be convenient.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method, comprising:
   receiving data via an electronic network;
   segmenting the data into data items;
   isolating one of the data items to obtain a selected data item;
   processing the selected data item in accordance with a first processing technique to obtain a first characteristic metric;
   processing the selected data item in accordance with a second processing technique to obtain a second characteristic metric, wherein the second processing technique is different from the first processing technique;
   combining the first and second characteristic metrics to obtain an aggregate thumbprint of the selected data item; and
   comparing the aggregate thumbprint to a plurality of aggregate thumbprints stored in a library of aggregate thumbprints to determine whether a match exists between the aggregate thumbprint and any of the aggregate thumbprints in the library of aggregate thumbprints,
   wherein processing comprises adding to a counter when a subsequent byte has an ASCII value greater than an immediately prior byte, and subtracting from the counter when a subsequent byte has an ASCII vale that is less than an immediately prior byte.

2. The method of claim 1, further comprising decreasing the precision of the first and second characteristic metrics.

3. The method of claim 2, comprising rounding values of the first and second characteristics metrics.

4. The method of claim 1, wherein combining comprises concatenating the first and second characteristic metrics into a string.

5. The method of claim 1, wherein processing comprises counting a number of bytes in the selected data item.

6. The method of claim 1, wherein processing comprises adding even byte values and subtracting odd byte values.

7. The method of claim 1, applying a hashing function to the selected data item after the processing steps.

8. The method of claim 1, further comprising storing in the library of aggregate thumbprints an aggregate thumbprint for which no match exists.

9. The method of claim 1, further comprising generating an alert when a match exists.

10. A method of detecting similar, but non-identical, data, comprising:
    selecting a data item from a database;
    generating a string, wherein the string is comprised of a plurality individual characteristic metrics in respect to the data item, wherein each characteristic metric has been reduced in precision from an originally calculated value;
    comparing the string to a plurality of strings stored in a library of strings to determine whether a match exists between the string and any of the strings stored in the library of strings; and
    generating an alert when a match is found or adding the string to the library of strings when a match is not found,
    wherein a characteristic metric is determined by adding to a counter when a subsequent byte in the data item has an ASCII value greater than an immediately prior byte, and subtracting from a counter when a subsequent byte in the data item has an ASCII vale that is less than an immediately prior byte.

11. The method of claim 10, wherein each characteristic metric is reduced in precision by rounding the respective characteristic metric.

12. The method of claim 10, wherein a characteristic metric is determined by counting a number of bytes in the data item.

13. The method of claim 10, wherein a characteristic metric is determined by adding even byte values and subtracting odd byte values of bytes in the data item.

14. The method of claim 10, further comprising applying a hashing function to the data item after generating the string.

15. A system for detecting similar data items, comprising:
an analysis module having, or being in communication with, physical memory configured to store electronic data;
a data item database in communication with the analysis module; and
a string library in communication with the analysis module,
wherein the analysis module is configured to
  select a data item from the data item database,
  generate a string comprised of a plurality individual characteristic metrics in respect to the data item where each characteristic metric is reduced in precision from an originally calculated value,
  compare the string to a plurality of strings stored in the string library to determine whether a match exists between the string and any of the strings stored in the string library, and
  generate an alert when a match is found, or add the string to the string library when a match is not found,
  wherein a characteristic metric is determined by adding to a counter when a subsequent byte in the data item has an ASCII value greater than an immediately prior byte, and subtracting from a counter when a subsequent byte in the data item has an ASCII vale that is less than an immediately prior byte.

16. The system of claim 15, further comprising a server that captures network data and is configured to store the network data in the data item database.

17. The system of claim 15, wherein one of the individual characteristic metrics is a byte count of the data item.

18. The system of claim 15, wherein one of the individual characteristic metrics is a measure of sort order of characters in the data item.

\* \* \* \* \*